United States Patent Office 3,754,019
Patented Aug. 21, 1973

3,754,019
5-ARYLPHENYLPHOSPHONIC AND PHOSPHONOUS ACIDS
Lewis H. Sarett, Skillman, and John Hannah, Matawan, N.J., assignors to Merck & Co. Inc., Rahway, N.J.
No Drawing. Continuation-in-part of application Ser. No. 836,665, June 25, 1969. This application Apr. 20, 1970, Ser. No. 30,324
Int. Cl. 07f 9/30, 9/40, 9/48
U.S. Cl. 260—479 R      10 Claims

ABSTRACT OF THE DISCLOSURE 5-arylphenylphosphonic and phosphonous acids and their derivatives are described and the processes for preparing the same are disclosed. These compounds exhibit anti-inflammatory properties and also possess an effective degree of anti-pyretic and analgesic activity.

CROSS REFERENCE TO RELATED APPLICATIONS

This application is a continuation-in-part of our copending U.S. application S.N. 836,665 filed June 25, 1969 and now abandoned.

BACKGROUND OF THE INVENTION

There has been much emphasis during the past two decades to synthesize anti-inflammatory compounds. Many of those agents developed have been highly effective steroids, but are complex in structure. The most desirable anti-flammatory agent should be relatively active and simple in structure.

SUMMARY OF THE INVENTION

This invention is new 5-arylphenylphosphonic and phosphonous acid compounds and their derivatives, as well as the processes for preparing these compounds and their use as medicinal agents. In particular, new 5-aryl-2-hydroxyphenylphosphonic and phosphonous acids and their derivatives are the object of this invention. These compounds contain a useful degree of anti-inflammatory activity and effectively prevent and inhibit edema and granuloma tissue formation. These compounds further contain a moderate degree of anti-pyretic and analgesic activity.

DESCRIPTION OF THE PREFERRED EMBODIMENTS

New 5-arylphenylphosphonic and phosphonous acid compounds and their derivatives are described in this invention. More specifically, this invention describes new 5-aryl - 2 - hydroxyphenylphosphonic and phosphonous acid derivatives and further relates to the non-toxic pharmaceutically acceptable salts, esters and amides of these phosphonic and phosphonous acids. Included also in this invention are their methods of preparation and their treatment as medicinal agents.

In a more narrow aspect, the present invention embraces those compounds having the following structural Formulae I and II.

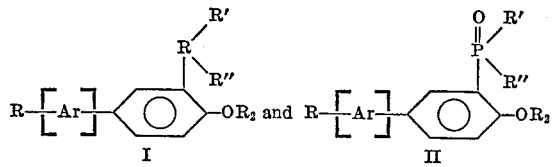

where

Ar is any benzenoid or non-benzenoid aromatic-like structure (preferably phenyl, styryl, naphthyl, etc.) containing one or more R substituents which may be at any position on the ring (preferably at the 2, 4 and 6-positions:)

R is hydrogen, alkyl (preferably lower alkyl such as methyl, ethyl, propyl, i-propyl, etc.), halogen (preferably fluoro and chloro), haloalkyl (preferably halo-loweralkyl such as trifluoromethyl), hydroxy, alkoxy (preferably lower alkoxy such as methoxy, ethoxy, etc.), nitro, amino, alkylamino (preferably lower alkylamino such as methylamino, ethylamino, etc.), dialkylamino (preferably dilower alkylamino such as dimethylamino, methylethylamino, etc.), alkylthio preferably lower alkylthio such as methylthio, ethylthio, etc.), alkylsulfonyl (preferably lower alkylsulfonyl such as methylsulfonyl), alkylsulfenyl (preferably lower alkylsulfenyl such as methylsulfenyl) and sulfamyl;

R' and R" are
—OH,
—OM where M in general is any base which will form an acid addition salt with a phosphonic or phosphonous acid and whose pharmacological properties will not cause an adverse physiological effect when ingested by the body system (preferably an alkali, alkaline earth or aluminum metal such as sodium, potassium, calcium magnesium and aluminum metals), —OR$_1$ where R$_1$ is alkyl (preferably lower alkyl such as methyl, ethyl, propyl, i-propyl, etc.), aryl (preferably mononuclear aryl such as phenyl, tolyl, xylyl, etc.), aralkyl (preferably a lower alkyl such as benzyl, phenethyl, etc.),

where
R$_3$ and R$_4$ are hydrogen, alkyl, (preferably lower alkyl such as methyl, ethyl, propyl, etc., cycloalkyl (preferably cyclolower alkyl such as cyclopropyl, cyclobutyl, etc.), aryl (preferably phenyl), aralkyl (preferably a lower alkyl such as benzyl, phenethyl, etc).;
R$_3$ and R$_4$ may be the same or different and when taken together form a heterocyclic ring such as piperidino, morpholino, N'-alkyl-piperazino, homopiperazino, pyrrolidino, etc.;

R' and R" may be the same or different and when taken together form an alkylene residue (preferably loweralkylene such as ethylene propylene, butylene, etc.); and
R$_3$ is
hydrogen,
alkyl (preferably alkyl such as methyl, ethyl, propyl, i-propyl, etc.),
aralkyl (preferably a lower alkyl such as benzyl, phenethyl, etc.), or
acyl (preferably lower acyl such as formyl, acetyl, propionyl, butyryl, etc.).

The more preferred compounds of this invention embrace those compounds of the structural Formulae I and II where Ar is phenyl;
R is halo, lower dialkylamino or lower alkoxy;
R' and R" are
—OH,
—OM,
—OR$_1$ where R$_1$ is lower alkyl,
—NH$_2$

where R$_3$ and R$_4$ are lower alkyl; and
R$_2$ is hydrogen or acetyl.

The most preferred compounds of this invention embrace those compounds of the structural Formulae I and II where Ar is phenyl, R is halo, R' and R" are —OH and R$_2$ hydrogen.

Representative compounds of this invention are as follows:

5-(p-fluorophenyl)-2-hydroxyphenyl phosphonic acid
5-(p-fluorophenyl)-2-hydroxyphenyl phosphonous acid
5-(p-fluorophenyl)-2-acetoxyphenyl phosphonic acid
5-(p-fluorophenyl)-2-acetoxyphenyl phosphonous acid
5-(p-chlorophenyl)-2-hydroxyphenyl phosphonous diamide
5-(p-fluorophenyl)-2-hydroxyphenyl phosphonamide
5-(p-dimethylaminophenyl)-2-hydroxyphenyl-N,N,N',N'-tetramethyl phosphonous diamide
5-(2,6-dichlorophenyl)-2-methoxyphenyl phosphonous acid
5-styryl-2-methoxyphenyl N,N'-dimethyl-N,N'-diethyl phosphonous diamide
5-(α-naphthyl)-2-hydroxyphenyl phosphonous dipyrrolidinamide
methyl 5-(o-methylphenyl)-2-hydroxyphenyl phosphonamidate
5-(p-fluorophenyl)-2-hydroxyphenyl phosphonous diamide.

Various tests in animals are carried out to show the ability of compounds to exhibit reactions that can be correlated with anti-inflammatory activity in humans. One such test used is the carrageenin testing method, which is known to correlate well with anti-inflammatory activity in humans and is a standard test used to determine anti-inflammatory activities. This is outlined in detail by C. A. Winter, Proc. Soc. Biolog. & Med., 1962, III, 544. This test shows the correlation between clinically active compounds such as indocin, aspirin, butazolidin, tandearil, cortone, hydrocortone, decadron and those of unknown activity. In view of results from tests such as this, the instant compounds can be considered to be active anti-inflammatory agents.

We have found that the compounds described in this invention have anti-inflammatory activity and are effective in the prevention and inhibition of edema and granuloma tissue formation. In addition, they have a useful degree of anti-pyretic and analgesic activity. For these purposes, they may be administered orally, topically, parenterally or rectally. Orally, they may be administered in tablets or capsules, the optimum dosage depending on the particular compound being used and the type and severity of the condition being treated. Although the optimum quantities to be used will depend on the compound employed and the particular type of disease treated, oral dose levels of preferred compounds in the range of 0.5-30 mg./kg. (preferably on the range of 3-15 mg./kg. per day) are useful in control of arthritic conditions, depending on the activity of the specific compound and the reaction sensitivity of the patient. Comparable dosages may be used when the administration is topically, parenterally or rectally.

The compounds of the present invention have further been found to show diuretic, anti-fibrinolytic and hypoglycemic activity and the same dosage ranges as above will apply when used for these utilities.

The 5-aryl-2-hydroxyphenyl phosphoric and phosphonous acids and derivatives of this invention are prepared by the following reactions which contain a reference where that method may be found in the examples of the invention.

The definition of each of the groups is described as above except where noted.

5-aryl-2-alkoxy or aralkoxyphenyl magnesium halides (preferably bromide) react readily with a phosphorochloridate or phosphorobromidate to obtain the 5-aryl-2-alkoxy or aralkoxyphenyl phosphoric acid diester. This may further be carried out on the lithium compounds in place of the Grignard reagent. The phosphorochloridates which undergo this reaction can be alkyl, or aralkyl or aryl esters and which may also be symmetrical or mixed esters. The reaction is preferably carried out in an inert atmosphere using a non-polar solvent and gentle heating (Example I).

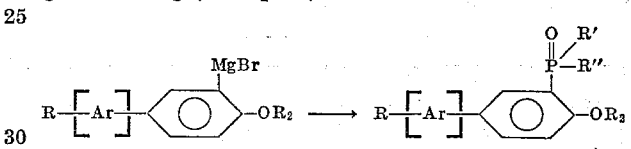

where R' and R" are —OR$_1$ and R$_2$ is alkyl or aralkyl.

It is convenient to prepare the 5-aryl-2-benzyloxyphenyl phosphonates since the benzyl group can then be reduced off using ruthenium catalyst which does not affect the ester moiety (Example I), or when R is halogen. This results in the 5-aryl-2-hydroxyphenyl phosphonates which can then be hydrolyzed in acid to give the 5-aryl-2-hydroxyphenyl phosphoric acids (Example I).

When the 2-acyloxy compounds are desired, the 5-aryl-2-hydroxyphenyl phosphoric acid or ester may then be acylated in the presence of phosphoric acid and heat. This results in the 5-aryl-2-acyloxyphenyl phosphoric acid or ester (Example II).

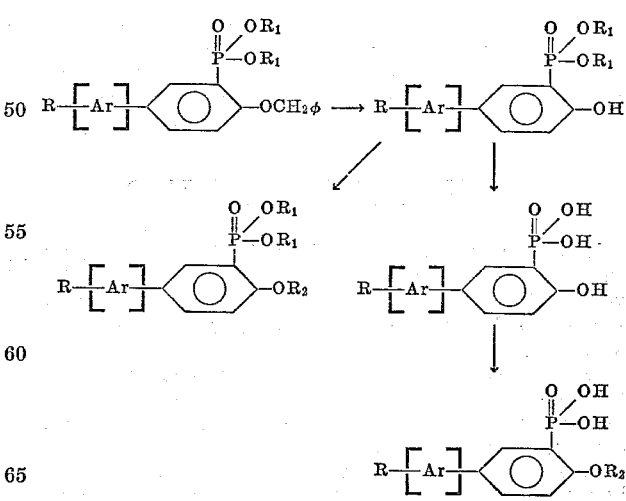

where R$_2$ is acyl.

5-aryl-2-alkoxy or aralkoxyphenyl magnesium halides (preferably bromide) react in a similar manner as above with phosphorodiamidic halides to obtain 5-aryl-2-alkoxy or aralkoxyphenyl phosphonamides. These also react on the lithium compounds to obtain the same result. The amide may by symmetrical or a mixed amide. The amide may be part of a heterocyclic ring. The reaction is preferably carried out in an inert atmosphere with a polar solvent and gentle heating (Example III).

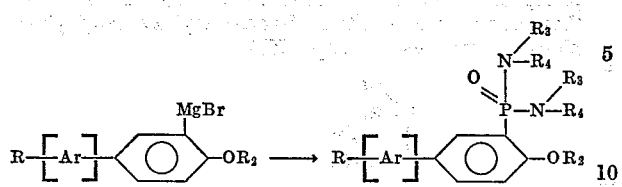

where: $R_3 = R_4 =$ hydrogen, the following synthesis is used:

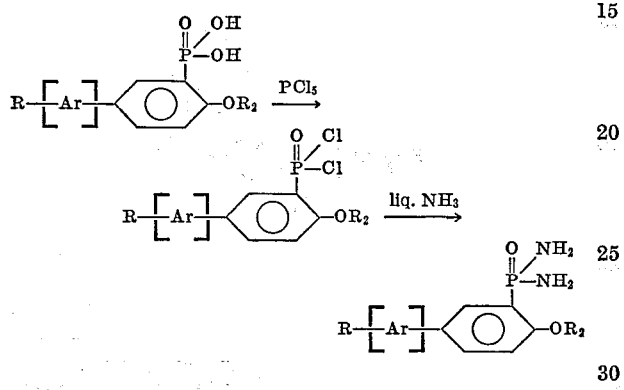

where $R_2$ is alkyl or aralkyl.

Again, it is convenient to utilize the 2-benzyloxy compounds when undergoing amidation. Reduction of 5-aryl-2-benzyloxyphenyl phosphonamides with ruthenium catalyst results in 5-aryl-2-hydroxyphosphonamides (Example III) which are then acylated as above to give the desired 5-aryl-2-acyloxyphenyl phosphonamides (Example IV).

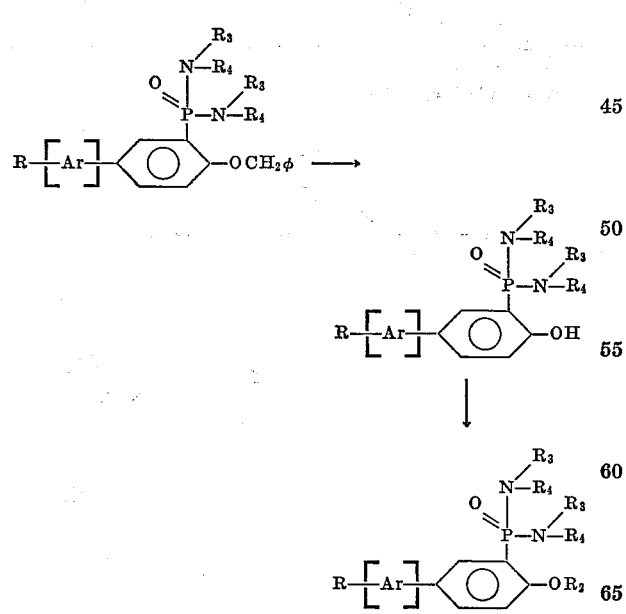

where $R_2$ is acyl.

Preparation of the mixed amide-esters or amide-acids is carried out following the above synthesis. 5-aryl-2-alkoxy or aralkoxyphenyl magnesium halides (preferably bromide) or the lithium compounds react with phosphorodiamidic halides or phosphoroamidic ester halides ot obtain 5-aryl-2-alkoxy or aralkoxyphenyl phosphonamides or phosphonamidates. The esters and amides need not be similar (Example V).

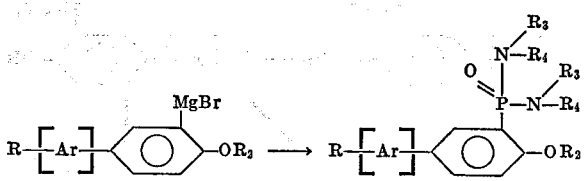

where $R_2$ is alkyl or aralkyl.

The 2-benzyloxy compound is then reduced as above and 5-aryl-2-hydroxyphenyl phosphonamides or phosphonamidates result (Example V). Acylation gives 5-aryl-2-acyloxyphenyl phosphonamides or phosphonamidates (Example VI).

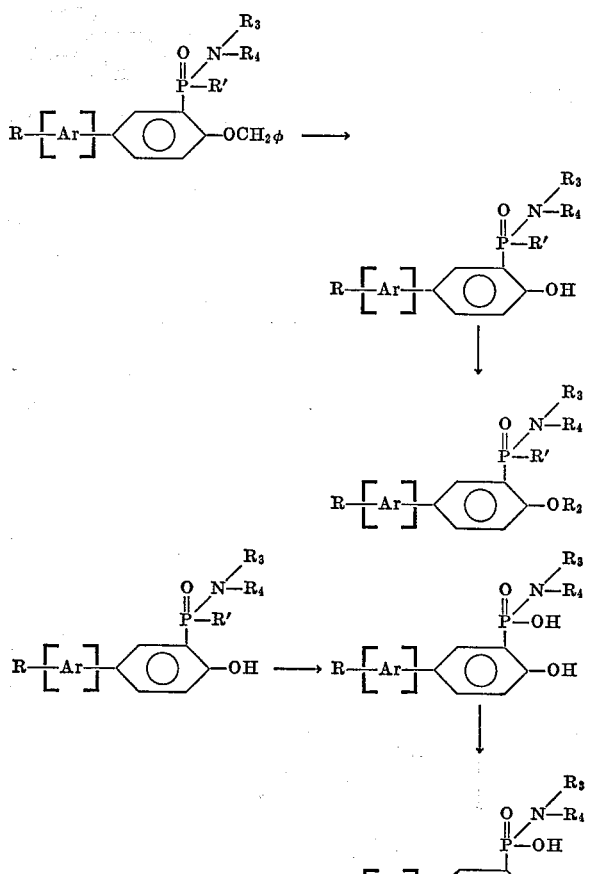

where R, $R_3$ and $R_4$ are as described above and R' is $-OR_1$ and $R_2$ is alkyl or aralkyl.

The preparation of the phosphonous acids and the phosphonous acid esters follows the synthesis of the phosphonic acids and esters (Example VII–IX).

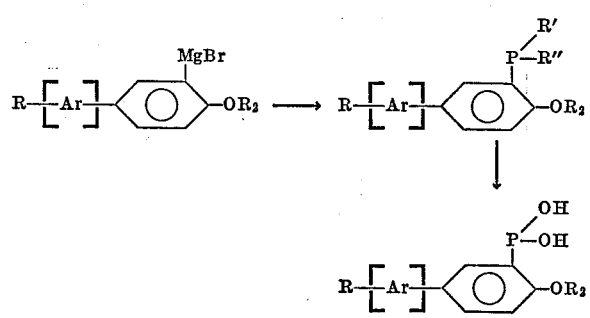

where R' and R" are —OR$_1$ and R$_2$ is alkyl or aralkyl.

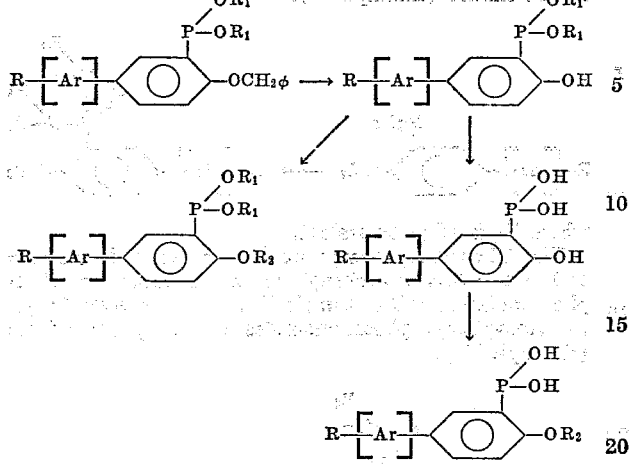

where R$_2$ is acyl.

The 5-aryl-2-alkoxy or aralkoxy phosphonites and phosphonites and phosphonous acids are converted to the corresponding dichlorophosphine compound by phosphorus trichloride. This reaction is preferably carried out at a low temperature and an inert atmosphere (Example X).

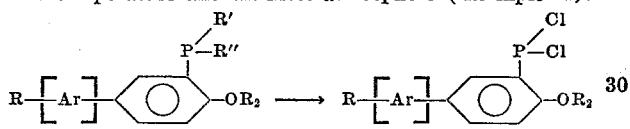

where R' and R" are —OH or OR$_1$ and R$_2$ is alkyl or aralkyl.

The desired 5-aryl-2-alkoxy or aralkoxy phosphinamide is prepared from the corresponding dichlorophosphine compound by the suitable amine. The symmetrical or mixed amides are prepared depending on the amount of amine added, thus two equivalents of the amine will result in the bis amide while addition of one equivalent of one amine followed by one equivalent of a different amine will result in the mixed diamide.

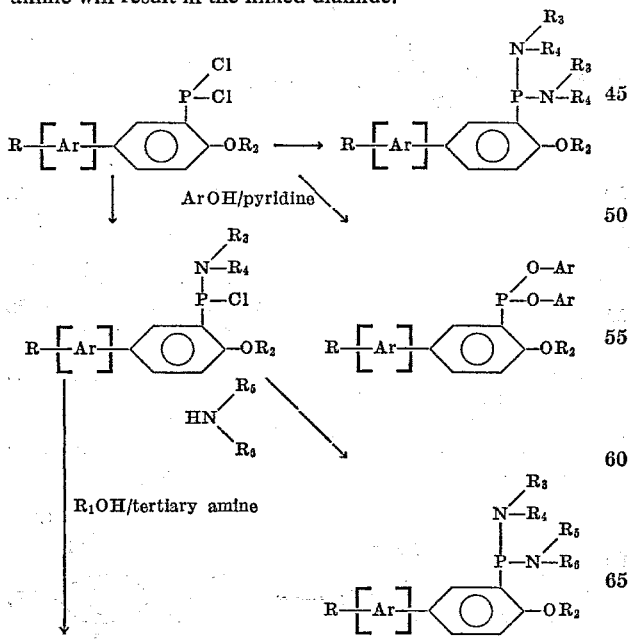

where R$_2$ is alkyl or aralkyl.

Reduction of the 5-aryl-2-benzyloxyphenyl phosphonous diamides results in the 5-aryl-2-hydroxyphenyl phosphonous diamides (Example X) and acylation of these compounds results in 5-aryl-2-acyloxyphenyl phosphonous diamides (Example XI).

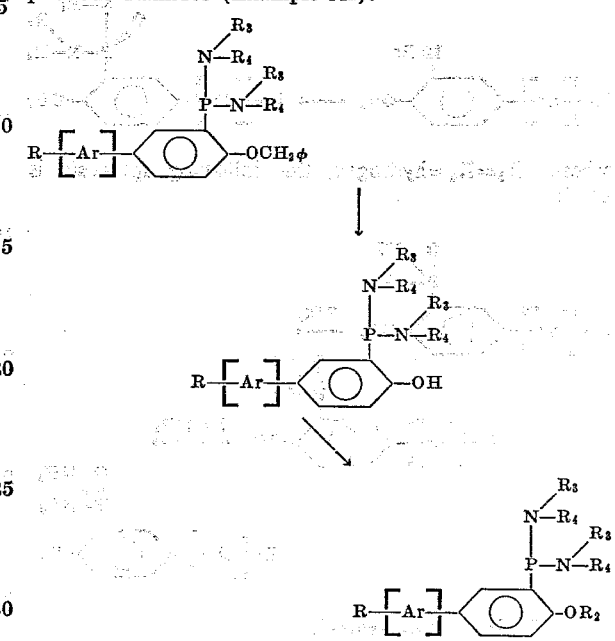

where R$_2$ is acyl.

The preparation of phosphonamidates and mixed phosphonous diamides is carried out by the synthesis already described for phosphonamidates and mixed phosphonamides.

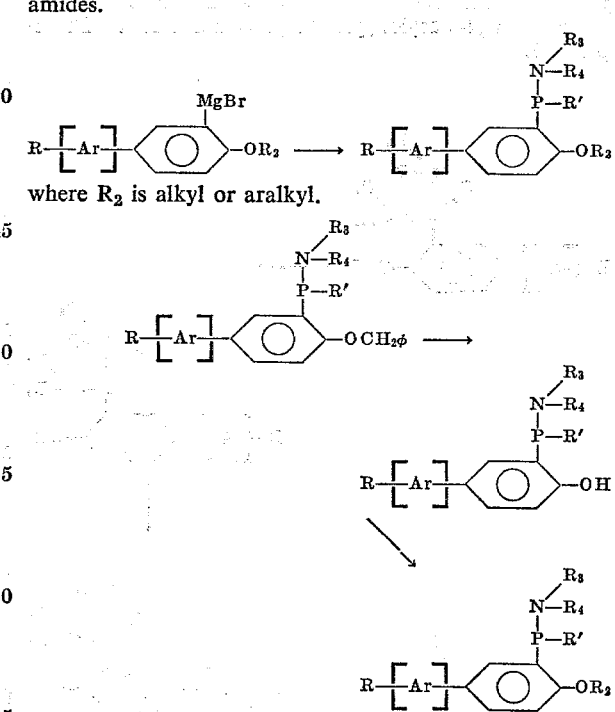

where R$_2$ is acyl.

End products having various R substituents may be prepared at various stages of the synthesis by converting one R group to another. Thus, for example, a nitro group can be reduced to an amino group and a hydroxy group can be prepared by demethylation of a methoxy substituent. Mercapto groups can be converted into alkylthio, alkylsulfonyl or alkylsulfenyl groups and can further be oxidized to the sulfonic acids which can be converted to sulfamyl compounds.

The 5-aryl-2-alkoxy or aralkoxyphenyl magnesium halide starting materials of this invention can be prepared from known compounds. Reduction of known 4-aryl nitro-benzene compounds to the corresponding aniline is carried out by conventional methods. This is then diazotized to the desired phenol, which when brominated results in the 4-aryl-2-bromophenols. The alcohol group may then be alkylated or aralkylated followed by conversion of the 2-bromo group to the Grignard reagent (Example I).

Example I: 5-(p-fluorophenyl)-2-hydroxyphenylphosphonic acid

EXAMPLE I-1

4-(p-fluorophenyl) - 2 - bromophenol.—Bromine (1.0 mole) is added dropwise to a refluxing solution of 4-(p-fluorophenyl)phenol (1.0 mole) in 10 volumes of chloroform. The solution is allowed to cool to room temperature for two hours; the chloroform is partially evaporated and the solution diluted with hot cyclohexane and the crystalline product 4-(p-fluorophenyl)-2-bromophenol is filtered off.

When 4-(p-fluorophenyl)phenol is replaced in the above example with the various phenol compounds of Table I below, the corresponding bromophenol product of Table II below is prepared.

Table I 4-(p-chlorophenyl)phenol
4-(2,6-dichlorophenyl)phenol
4-(p-nitrophenyl)phenol
4-(p-dimethylaminophenyl)phenol
4-pentafluorophenylphenol
4-(o-methylphenyl)phenol
4-(p-methylphenyl)phenol
4-(p-methoxyphenyl)phenol
4-(p-trifluoromethylphenyl)phenol
4-(α-naphthyl)phenol
4-(β-naphthyl)phenol
4-styrylphenol
4-(p-methylthiophenyl)phenol Table II 4-(p-chlorophenyl)-2-bromophenol
4-(2,6-dichlorophenyl)-2-bromophenol
4-(p-nitrophenyl)-2-bromophenol
4-(p-dimethylaminophenyl)-2-bromophenol
4-pentafluorophenyl-2-bromophenol
4-(o-methylphenyl)-2-bromophenol
4-(p-methylphenyl)-2-bromophenol
4-(p-methoxyphenyl)-2-bromophenol
4-(p-trifluoromethylphenyl)-2-bromophenol
4-(α-naphthyl)-2-bromophenol
4-(β-naphthyl)-2-bromophenol
4-styryl-2-bromophenol
4-(p-methylthiophenyl)-2-bromophenol

Example I-2

5-(p-fluorophenyl)-2-benzyloxyphenyl bromide.—A solution of 4-(p-fluorophenyl)-2-bromophenol (1.0 mole) in 10 volumes of dimethoxyethane is converted to the sodium salt by adding a 50% sodium hydride oil dispersion (1.0 mole). The solution is heated to 50° and benzyl bromide (1.0 mole) is added dropwise with stirring over 30 minutes. The mixture is held at 50° for 1 hour and then evaporated to dryness. The residue is dissolved in chloroform and the inorganic salts washed out with water. The chloroform is then evaporated to dryness, leaving 5-(p-fluorophenyl)-2-benzyloxyphenyl which is recrystallized from ethanol.

When the compounds of Table II, Example I-1 are used in the above example in place of 4-(p-fluorophenyl)-2-bromophenol, the corresponding products of Table I are prepared.

Table I 5-(4'-chlorophenyl)-2-benzyloxyphenyl bromide
5-(2',6'-dichlorophenyl)-2-benzyloxyphenyl bromide
5-(4'-nitrophenyl)-2-benzyloxyphenyl bromide
5-(4'-dimethylaminophenyl)-2-benzyloxyphenyl bromide
5-(2',3',4',5',6'-pentafluorophenyl)-2-benzyloxyphenyl bromide
5-(2'-methylphenyl)-2-benzyloxyphenyl bromide
5-(4'-methylphenyl)-2-benzyloxyphenyl bromide
5-(4'-methoxyphenyl)-2-benzyloxyphenyl bromide
5-(4'-trifluoromethylphenyl)-2-benzyloxyphenyl bromide
5-(α-naphthyl)-2-benzyloxyphenyl bromide
5-(β-naphthyl)-2-benzyloxyphenyl bromide
5-styryl-2-benzyloxyphenyl bromide
5-(4'-methylthiophenyl)-2-benzyloxyphenyl bromide When benzyl bromide is replaced in the above example by methyl bromide, ethyl bromide, propyl bromide or phenethyl bromide, the corresponding alkoxy or aralkoxy compound is prepared. A representative list of the compounds prepared is shown below in Table II.

Table II 5-(4'-fluorophenyl)-2-methoxyphenyl bromide
5-(4'-fluorophenyl)-2-ethoxyphenyl bromide
5-(4'-fluorophenyl)-2-phenethoxyphenyl bromide
5-(4'-chlorophenyl)-2-methoxyphenyl bromide
5-(4'-nitrophenyl)-2-methoxyphenyl bromide
5-(4'-nitrophenyl)-2-phenethoxyphenyl bromide
5-(4'-dimethylaminophenyl)-2-methoxyphenyl bromide
5-(4'-trifluoromethylphenyl)-2-ethoxyphenyl bromide
5-(4'-methoxyphenyl)-2-propoxyphenyl bromide
5-(α-naphthyl)-2-methoxyphenyl bromide
5-styryl-2-methoxyphenyl bromide
5-(4'-methylphenyl)-2-methoxyphenyl bromide The following are detailed examples which show the preparation of the various compounds described in this invention. They are to be construed as illustrations of said compounds and not as limitations thereof.

Example I-3

Diisopropyl 5 - (p - fluorophenyl) - 2 - benzyloxyphenyl phosphonate.—To 1 mole of 5-(p-fluorophenyl-2-benzyloxyphenyl magnesium bromide (prepared from 1 mole of 4'-fluoro-3-bromo-4-benzyloxy and 1 mole of magnesium in ether by the conventional method) is added dropwise over a 30 minute period a solution of 1 mole diisopropylphosphorochloridate in 3 volumes of ether with stirring and heating to reflux. The mixture is then refluxed for 2 more hours, cooled and decomposed by adding ice and a slight excess of aqueous normal hydrochloride acid. The ethereal layer is washed with water, dried over magnesium sulfate and evaporated, leaving diisopropyl 5-(p-fluorophenyl)-2-benzyloxyphenyl phosphonate.

When the compounds of Table I, Example I-2 are used in the above example in place of 4'-fluoro-3-bromo-4-benzyloxybiphenyl, the corresponding diisoprophylphosphonates are prepared.

When the diisopropylphosphorochloridate in the above example is replaced by dimethylphosphorochloridate, diethylphosphorochloridate, dipropylphosphorochloridate, methylethylphosphorochloridate, dibenzylphosphorochloridate and diphenylphosphorochloridate, the corresponding diester is prepared. A representative list of the compounds prepared is shown in Table I below:

Table I diethyl 5-(p-fluorophenyl)-2-benzyloxyphenyl phosphonate
dipropyl 5-(p-fluorophenyl)-2-benzyloxyphenyl phosphonate
dibenzyl 5-(p-fluorophenyl)-2-benzyloxyphenyl phosphonate TABLE I—Continued diphenyl 5-(p-fluorophenyl)-2-benzyloxyphenyl phosphonate
diethyl 5-(p-chlorophenyl-2-benzyloxyphenyl phosphonate
diisopropyl 5-(p-nitrophenyl)-2-benzyloxyphenyl phosphonate
dibenzyl 5-(p-nitrophenyl)-2-benzyloxyphenyl phosphonate
diethyl 5-(p-dimethylaminophenyl)-2-benzyloxyphenyl phosphonate
diisopropyl 5-(p-trifluoromethylphenyl)-2-benzyloxyphenyl phosphonate
diisopropyl 5-($\alpha$-naphthyl)-2-benzyloxyphenyl phosphonate
dimethyl 5-($\beta$-naphthyl)-2-benzyloxyphenyl phosphonate
diisopropyl 5-styryl-2-benzyloxyphenyl phosphonate
methylethyl 5-(p-fluorophenyl)-2-benzyloxyphenyl phosphonate When the compounds of Table II, Example I-2 are used in place of 4'-fluoro-3-bromo-4-benzyloxybiphenyl in the above example, the corresponding phosphonic acid diesters are prepared. A representative list of these compounds is shown in Table II below.

Table II diisopropyl 5-(p-fluorophenyl)-2-methoxyphenyl phosphonate
diisopropyl 5-(p-fluorophenyl)-2-phenethoxyphenyl phosphonate
diethyl 5-(p-chlorophenyl)-2-methoxyphenyl phosphonate
dibenzyl 5-(p-nitrophenyl)-2-methoxyphenyl phosphonate
dimethyl 5-(p-nitrophenyl)-2-phenethoxyphenyl phosphonate
dipropyl 5-(p-dimethylaminophenyl)-2-methoxyphenyl phosphonate
diisopropyl 5-(p-trifluoromethylphenyl)-2-ethoxyphenyl phosphonate
diisopropyl 5-(p-methoxyphenyl)-2-propoxyphenyl phosphonate
diisopropyl 5-($\alpha$-naphthyl)-2-methoxyphenyl phosphonate
diethyl 5-styryl-2-methoxyphenyl phosphonate Example I-4

Diisopropyl 5-(p-fluorophenyl)-2-hydroxyphenyl phosphonate.—A solution of 0.01 mole of diisopropyl 5-(p-fluorophenyl)-2-benzyloxyphenyl phosphonate in 15 ml. of methanol is hydrogenated, using 10% ruthenium-on-charcoal (0.5 g.) to a 1 mole hydrogen uptake. The mixture is filtered through Filtercel and evaporated to leave diisopropyl 5-(p-fluorophenyl) - 2 - hydroxyphenyl phosphonate.

When the compounds of Table I, Example I-3, are used in the above example in place of diisopropyl 5-(p-fluorophenyl)-2-benzyloxyphenyl phosphonate, the corresponding products of Table I below are prepared.

Table I diethyl 5-(p-fluorophenyl)-2-hydroxyphenyl phosphonate
dipropyl 5-(p-fluorophenyl)-2-hydroxyphenyl phosphonate
diphenyl 5-(p-fluorophenyl)-2-hydroxyphenyl phosphonate
diethyl 5-(p-chlorophenyl)-2-hydroxyphenyl phosphonate
diisopropyl 5-(p-nitrophenyl)-2-hydroxyphenyl phosphonate
diethyl 5-(p-dimethylaminophenyl)-2-hydroxyphenyl phosphonate
diisopropyl 5-(p-trifluoromethylphenyl)-2-hydroxyphenyl phosphonate TABLE I—Continued diisopropyl 5-($\alpha$-naphthyl)-2-hydroxyphenyl phosphonate
dimethyl 5-($\beta$-naphthyl)-2-hydroxyphenyl phosphonate
diisopropyl 5-styryl-2-hydroxyphenyl phosphonate
methylether 5-(p-fluorophenyl)-2-hydroxyphenyl phosphonate Example I-5

5-(p-fluorophenyl)-2-hydroxyphenylphosphonic acid.—A solution of 0.01 mole of diisopropyl-5-(p-fluorophenyl)-2-hydroxyphenyl phosphonate in 10 volumes of aqueous concentrated hydrochloric acid is refluxed for 30 minutes, then evaporated to dryness in vacuo leaving 5-(p-fluorophenyl)-2-hydroxyphenylphosphonic acid.

When diisopropyl-5-(p-fluorophenyl)-2-hydroxyphenyl phosphonate is replaced in the above example by the methyl, ethyl or phenyl esters and refluxing is continued for 20 hours, the corresponding phosphonic acid is prepared.

When diisopropyl-5-(p-fluorophenyl)-2-hydroxyphenyl phosphonate is replaced in the above reaction by the compounds of Table I, Example I-4, the corresponding phosphonic acids of Table I below are prepared.

Table I 5-(p-fluorophenyl)-2-hydroxyphenyl phosphonic acid
5-(p-chlorophenyl)-2-hydroxyphenyl phosphonic acid
5-(p-nitrophenyl)-2-hydroxyphenyl phosphonic acid
5-(p-dimethylaminophenyl)-2-hydroxyphenyl phosphonic acid
5-(p-trifluoromethylphenyl)-2-hydroxyphenyl phosphonic acid
5-($\alpha$-naphthyl)-2-hydroxyphenyl phosphonic acid
5-($\beta$-naphthyl)-2-hydroxyphenyl phosphonic acid
5-styryl-2-hydroxyphenyl phosphonic acid Example II 5-(p-fluorophenyl)-2-acetoxyphenyl phosphonic acid A solution of 2 g. of 5-(p-fluorophenyl)-2-hydroxyphenyl phosphonic acid is dissolved in 4 ml. of acetic anhydride and containing 0.2 ml. of 85% phosphoric acid, is heated at 100° for 10 minutes, cooled to 80° and 2 ml. of water is added to destroy the excess acetic anhydride. When the decomposition is complete, 10 ml. of water is added and the mixture cooled to 0° and the product is filtered off to leave 5-(p-fluorophenyl)-2-acetoxyphenyl phosphonic acid.

When propionic anhydride, butyric anhydride or crotonic anhydride are used in place of acetic anhydride in the above example, the products prepared are 5-(p-fluorophenyl)-2-propionyloxyphenyl phosphonic acid, 5-(p-fluorophenyl)-2-butyryloxyphenyl phosphonic acid and 5-(p-fluorophenyl)-2-crotonyloxyphenyl phosphonic acid.

When the compounds of Example I-5 are used in place of 5-(p-fluorophenyl)-2-hydroxyphenyl phosphonic acid in the above example, the corresponding acyloxy compounds are prepared. A representative list of these compounds is shown below in Table I.

Table I 5-(p-chlorophenyl)-2-propionyloxyphenyl phosphonic acid
5-(p-nitrophenyl)-2-propionyloxyphenyl phosphonic acid
5-(p-trifluoromethylphenyl)-2-propionyloxyphenyl phosphonic acid
5-($\alpha$-naphthyl)-2-butyryloxyphenyl phosphonic acid
5-styryl-2-crotonyloxyphenyl phosphonic acid
5-(p-methoxyphenyl)-2-crotonyloxyphenyl phosphonic acid When the compounds of Example I-4, Table I, are used in place of 5-(p-fluorophenyl)-2-hydroxyphenyl phosphonic acid in the above example, the corresponding acyloxy compounds are prepared. A representative list of these compounds is shown in Table II.

Table II diethyl 5-(p-fluorophenyl)-2-acetoxyphenyl phosphonate
dipropyl 5-(p-fluorophenyl)-2-acetoxyphenyl phosphonate
diphenyl 5-(p-fluorophenyl)-2-acetoxyphenyl phosphonate
diethyl 5-(p-chlorophenyl)-2-acetoxyphenyl phosphonate
diisopropyl 5-(p-nitrophenyl)-2-acetoxyphenyl phosphonate
diethyl 5-(p-dimethylaminophenyl)-2-acetoxyphenyl phosphonate
diisopropyl 5-(p-trifluoromethylphenyl)-2-acetoxyphenyl phosphonate
diisopropyl 5-($\alpha$-naphthyl)-2-acetoxyphenyl phosphonate
dimethyl 5-($\beta$-naphthyl)-2-acetoxyphenyl phosphonate
diisopropyl 5-styryl-2-acetoxyphenyl phosphonate
methylethyl 5-(p-fluorophenyl)-2-acetoxyphenyl phosphonate

EXAMPLE III: N,N,N',N' - TETRAETHYL - 5 - (P-FLUOROPHENYL) - 2-HYDROXYPHENYL PHOSPHONAMIDE

Example III–1

N,N,N',N'-tetraethyl - 5-(p-fluorophenyl)-2-benzyloxyphenyl phosphonamide.—To a solution of 1 mole of 5-(p-fluorophenyl)-2-benzyloxyphenyl magnesium bromide (prepared from 1 mole of 4'-fluoro-3-bromo-4-benzyloxybiphenyl and 1 mole of magnesium in ether by the conventional method), is added dropwise over a 30 minute period a solution of 1 mole of N,N,N',N'-tetraethylphosphorodiamidic chloride in 3 volumes of ether. The reaction mixture is then stirred and heated to reflux for 2 hours, decomposed by adding ice and a slight excess of aqueous 1 N hydrochloric acid. The ether layer is washed with water, dried over magnesium sulfate, and evaporated to dryness, leaving N,N,N',N'-tetraethyl-5-(p-fluorophenyl)-2-benzyloxyphenyl phosphonamide.

The corresponding phosphonic acid diamide is prepared when N,N,N',N'-tetraethylphosphorodiamidic chloride is replaced in the above example by:

N,N,N',N'-tetramethylphosphorodiamidic chloride
N,N-dimethyl-N',N'-diethylphosphorodiamidic chloride
N,N,N',N'-tetraisopropylphosphorodiamidic chloride
N,N,N',N'-tetrabenzylphosphorodiamidic chloride
N,N-diphenylphosphorodiamidic chloride
N,N'-dimethyl-N,N'-diethylphosphorodiamidic chloride
N,N,N',N'-tetracyclopropylphosphorodiamidic chloride
phosphorodipiperidic chloride
phosphorodimorpholidic chloride
phosphoro di-(N'-methylpiperazic)chloride
phosphoro dipyrrolidic chloride When the compounds of Table I, Example I–2 are used in place of 4'-fluoro-3-bromo-4-benzyloxybiphenyl in the above example, the corresponding amides are prepared. A representative list of these compounds is shown below in Table I.

Table I

N,N,N',N'-tetramethyl-5-(p-fluorophenyl)-2-benzyloxyphenyl phosphonamide
N,N'-dimethyl-N,N'-diethyl-5-(p-chlorophenyl)-2-benzylphenyl phosphonamide
5-(p-nitrophenyl)-2-benzyloxyphenyl phosphonic di-(N'-methylpiperazinamide)
N,N,N',N'-tetraethyl-5-(p-methoxyphenyl)-2-benzyloxyphenyl phosphonamide
N,N,N',N'-tetraisopropyl-5-(p-fluorophenyl)-2-benzyloxyphenyl phosphonamide
5-(p-dimethylaminophenyl)-2-benzyloxyphenyl phosphonic dimorpholinamide
N,N-diphenyl-5-(o-methylphenyl)-2-benzyloxyphenyl phosphonamide
N,N,N',N'-tetrabenzyl-5-(p-fluorophenyl)-2-benzyloxyphenyl phosphonamide
5-($\alpha$-naphthyl)-2-benzyloxyphenyl phosphonic dipiperidinamide
5-(p-methylthiophenyl)-2-benzyloxyphenyl phosphonic dipyrrolidinamide
N,N,N',N'-tetracyclopropyl-5-(p-trifluoromethylphenyl)-2-benzyloxyphenyl phosphonamide When the compounds of Table II, Example I–2, are use in place of 4'-fluoro-3-bromo-4-benzyloxybiphenyl in the above example, the corresponding amides are prepared. A representative list of these compounds is shown in Table II below.

Table II

N,N,N',N'-tetraethyl-5-(p-fluorophenyl)-2-methoxyphenyl phosphonamide
N,N,N',N'-tetramethyl-5-(p-fluorophenyl)-2-ethoxyphenyl phosphonamide
N,N,N',N'-tetrabenzyl-5-(p-nitrophenyl)-2-phenethoxyphenyl phosphonamide
N,N-dimethyl-N',N'-diethyl-5-(p-dimethylaminophenyl)-2-methoxyphenyl phosphonamide
5-(p-nitrophenyl)-2-methoxyphenyl phosphonic dipiperidinamide
5-(p-methylphenyl)-2-methoxyphenyl phosphonic dimorpholinamide
N,N-diphenyl-5-(p-methoxyphenyl)-2-propoxyphenyl phosphonamide
N,N,N',N'-tetracyclopropyl-5-(p-fluorophenyl)-2-phenethoxyphenyl phosphonamide
N,N,N',N'-tetraisopropyl-5-styryl-2-methoxyphenyl phosphonamide

Example III–2

N,N,N',N'-tetraethyl - 5 - (p-fluorophenyl)-2-hydroxyphenyl phosphonamide.—A solution of 0.01 mole of N,N,N',N'-tetraethyl - 5 - (p-fluorophenyl)-2-benzyloxyphenyl phosphonamide in 50 ml. of methanol is hydrogenated using 0.5 g. of 10% ruthenium-on-charcoal with a 1 mole uptake of hydrogen. The mixture is filtered throguh Filtercel and evaporated to dryness, leaving N,N,N',N' - tetraethyl-5(p-fluorophenyl)-2-hydroxyphenyl phosphonamide.

When the compounds of Table I, Example III–1, are used in place of N,N,N',N'-tetraethyl-5-(p-fluorophenyl)-2-benzyloxyphenyl phosphonamide in the above example the corresponding product of Table I below is prepared.

Table I

N,N,N',N'-tetramethyl-5-(p-fluorophenyl)-2-hydroxyphenyl phosphonamide
N,N'-dimethyl-N,N'-diethyl-5-(p-chlorophenyl)-2-hydroxyphenyl phosphonamide
5-(p-nitrophenyl)-2-hydroxyphenyl phosphonic dipiperazinamide
N,N,N',N'-tetraethyl-5-(p-methoxyphenyl)-2-hydroxyphenyl phosphonamide
N,N,N',N'-tetraisopropyl-5-(p-fluorophenyl)-2-hydroxyphenyl phosphonamide
5-(p-dimethylaminophenyl)-2-hydroxyphenyl phosphonic dimorpholinamide
N,N-diphenyl-5-(o-methylphenyl)-2-hydroxyphenyl phosphonamide
5-(p-fluorophenyl)-2-hydroxyphenyl phosphonamide
N,N,N',N'-tetracyclopropyl-5-(p-chlorophenyl)-2-hydroxyphenyl phosphonamide
5-($\alpha$-naphthyl)-2-hydroxyphenyl phosphonic dipiperidinamide
5-(p-methylthiophenyl)-2-hydroxyphenyl phosphonic dipyrrolidinamide
N,N,N',N'-tetraethyl-5-(p-trifluoromethylphenyl)-2-hydroxyphenyl phosphonamide

EXAMPLE IV

N,N,N',N'-tetraethyl-5-(p-fluorophenyl)-2-acetoxyphenyl phosphonamide

A solution of 2 g. of N,N,N',N'-tetraethyl-5-(p-fluorophenyl)-2-hydroxyphenyl phosphonamide in 4 ml. of acetic anhydride containing 0.2 ml. of 85% phosphoric acid is heated at 100° for 10 minutes, then cooled to 80° and 2 ml. of water is added to destroy the excess acetic anhydride. When the decomposition is complete, 10 ml. of water is added, the mixture cooled to 0° and the product is filtered off to obtain N,N,N',N'-tetraethyl-5-(p-fluorophenyl)-2-acetoxyphenyl phosphonamide.

When the acetic anhydride is replaced in the above example with propionic anhydride, butyric anhydride or crotonic anhydride, the corresponding product is prepared.

When N,N,N',N'-tetraethyl-5-(p-fluorophenyl)-2-hydroxyphenyl phosphonamide is replaced in the above example by the compounds of Table I, Example III-2, the corresponding product is prepared. A representative list of the compounds thus prepared is shown below.

Table I

N,N,N',N'-tetramethyl-5-(p-fluorophenyl)-2-propionoxyphenyl phosphonamide
N,N'-dimethyl-N,N'-diethyl-5-(p-chlorophenyl)-2-crotonoxyphenyl phosphonamide
5-(p-nitrophenyl)-2-acetoxyphenyl phosphonic dipiperazinamide
N,N,N',N'-tetraethyl-5-(p-methoxyphenyl-2-acetoxyphenyl phosphonamide
N,N,N',N'-tetraisopropyl-5-(p-fluorophenyl)-2-butyroxyphenyl phosphonamide
5-(p-dimethylaminophenyl)-2-acetoxyphenyl phosphonic dimorpholinamide
N,N-diphenyl-5-(o-methylphenyl)-2-acetoxyphenyl phosphonamide
5-(p-fluorophenyl)-2-acetoxyphenyl phosphonamide
N,N,N',N'-tetracyclopropyl-5-(p-chlorophenyl)-2-acetoxyphenyl phosphonamide
5-(α-naphthyl)-2-acetoxyphenyl phosphonic dipiperidinamide
5-(p-methylthiophenyl)-2-acetoxyphenyl phosphonic dipyrrolidinamide
N,N,N',N'-tetraethyl-5-(p-trifluoromethylphenyl)-2-propionoxyphenyl phosphonamide EXAMPLE V: ETHYL 5-(p-FLUOROPHENYL)-2-HYDROXYPHENYL-N,N-DIETHYL PHOSPHONAMIDATE Example V-1

Ethyl 5-(p-fluorophenyl)-2-benzyloxyphenyl-N,N-diethyl phosphonamidate.—A solution of 0.1 mole of 4'-fluoro-4-benzyloxybiphenyl-3-magnesium bromide (prepared from 0.1 mole of 4'-fluoro-3-bromo-4-benzyloxybiphenyl and 0.1 mole of magnesium in ether by the conventional method), is added, dropwise, over a 30 minute period to a solution of 0.1 mole of ethyl N,N-diethylphosphoroamidochloridate in 3 volumes of ether. The reaction mixture is then stirred and heated to reflux for 2 hours, decomposed by adding ice and a slight excess of aqueous 1 N hydrochloride acid. The ethereal layer is washed with water, dried over magnesium sulfate and evaporated to dryness, leaving ethyl 5-(p-fluorophenyl)-2-benzyloxyphenyl-N,N-diethyl phosphonamidate.

The corresponding amide-ester is prepared when ethyl N,N-diethylphosphoroamidochloridate is replaced in the example above by:

methyl phosphoromorpholidochloridate
phenyl phosphoro-(N'-methylpiperazido)-chloride
methyl N-methyl-N-isopropylphosphoroamidochloridate When the compounds of Table I, Example I-2, are used in place of 4'-fluoro-3-bromo-4-benzyloxybiphenyl in the above example, the corresponding amide-ester is prepared. A representative list of these compounds is shown in Table I.

Table I 5-(p-fluorophenyl)-2-benzyloxyphenyl phosphonamidic acid
methyl 5-(p-fluorophenyl)-2-benzyloxyphenyl-N,N-dimethyl phosphonamidate
benzyl 5-(p-fluorophenyl)-2-benzyloxyphenyl-N,N-diethyl phosphonamidate
methyl 5-(p-fluorophenyl)-2-benzyloxyphenyl phosphonomorpholidate
ethyl 5 - (p-nitrophenyl)-2-benzyloxyphenyl-N,N-diethyl phosphonamidate
methyl 5-(p-nitrophenyl-2-benzyloxyphenyl - 6 - methyl-N-i-propyl phosphonamidate
cyclopropyl 5-(p-dimethylaminophenyl) - 2 - benzyloxyphenyl N,N-diethyl phosphonamidate
ethyl 5-(o-methylphenyl)-2-benzyloxyphenyl-N,N-diethyl phosphonamidate
ethyl 5-(α-naphthylphenyl)-2-benzyloxyphenyl-N,N-diethyl phosphonamidate
ethyl 5-styryl-2-benzyloxyphenyl-N,N-diethyl phosphonamidate
phenyl 5 - (p-trifluoromethylphenyl)-2-benzyloxyphenyl-phosphono-N'-methylpiperazidate
methyl 5-(2,6-dichlorophenyl)-2-benzyloxyphenyl-N,N-dimethyl phosphonamidate
methyl 5-(p-methoxyphenyl)-2-benzyloxyphenyl-N,N-dibenzyl phosphonamidate When the compounds of Table II, Example I-2, are used in place of 4'-fluoro-3-bromo-4-benzyloxybiphenyl in the above example, the corresponding amide-ester is prepared. A representative list of these compounds is shown in Table II below.

Table II 5-(p-fluorophenyl)-2-methoxyphenyl phosphonamidic acid
methyl 5-(p-fluorophenyl)-2-methoxyphenyl-N,N-dimethyl phosphonamidate
ethyl 5 - (p-fluorophenyl)-2-methoxyphenyl-N,N-diethyl phosphonamidate
ethyl 5-(p-fluorophenyl) - 2 - ethoxyphenyl-N,N-diethyl phosphonamidate
benzyl 5-(p-nitrophenyl)-2-phenethoxyphenyl-N,N-diethyl phosphonamidate
methyl 5-(p-methylphenyl) - 2 - methoxyphenyl-N,N-dimethyl phosphonamidate
methyl 5 - (p-methoxyphenyl)-2-propoxyphenyl-N,N-dimethyl phosphonamidate
ethyl 5-(α-naphthyl)-2-methoxyphenyl-N,N-diethyl phosphonamidate
phenyl 5-(p-fluorophenyl)-2-phenethoxyphenyl-phosphono-N'-methylpiperazidate
ethyl 5-styryl-2-methoxyphenyl-N,N-diethyl phosponamidate
cyclopropyl 5-(p-dimethylaminophenyl)-2-methoxyphenyl-N,N-diethyl phosphonamidate
methyl 5-(p-fluorophenyl)-2-methoxyphenyl-phosphonomorpholidate Example V-2

Ethyl 5-(p-fluorophenyl)-2-hydroxyphenyl-N,N-diethyl phosphonamidate.—A solution of 0.02 mole of ethyl 5-(p-fluorophenyl) - 2 - benzyloxyphenyl-N,N-diethylphosphonamidate in 100 ml. of methanol is hydrogenated using 1.0 g. of 10% ruthenium-on-charcoal with a 1 mole uptake of hydrogen. The mixture is filtered through a pad of Filtercel and evaporated to dryness, leaving ethyl 5-(p-fluorophenyl) - 2 - hydroxyphenyl-N,N-diethylphosphonamidate.

When the compounds of Table I, Example V-1, are used in place of ethyl 5-(p-fluorophenyl)-2-benzyloxyphenyl-N,N-diethylphosphonamidate in the above example, the corresponding product of Table I is prepared.

Table I 5-(p-fluorophenyl)-2-hydroxyphenyl phosphonamidic acid
methyl 5-(p-fluorophenyl)-2-hydroxyphenyl-N,N-dimethyl phosphonamidate
methyl 5-(p-fluorophenyl)-2-hydroxyphenyl phosphonomorpholidate
ethyl 5-(p-nitrophenyl) - 2 - hydroxyphenyl-N,N-diethyl phosphonamidate
methyl 5-(p-nitrophenyl)-2-hydroxyphenyl-N-methyl-N-i-propyl phosphonamidate
cyclopropyl 5-(p-dimethylaminophenyl)-2-hydroxyphenyl-N,N-diethyl phosphonamidate
ethyl 5-(o-methylphenyl)-2-hydroxyphenyl-N,N'-diethyl phosphonamidate
ethyl 5-(α-naphthylphenyl)-2-hydroxyphenyl-N,N-diethyl phosphonamidate
phenyl 5-(p-trifluoromethylphenyl)-2-hydroxyphenyl-phosphono-N'-methylpiperazidate
methyl 5-(2,6-dichlorophenyl)-2-hydroxyphenyl-N,N-dimethyl phosphonamidate

EXAMPLE VI

Ethyl 5-(p-fluorophenyl)-2-acetoxyphenyl-N,N-diethyl phosphonamidate

A solution of 4 g. of ethyl 5-(p-fluorophenyl)-2-hydroxyphenyl-N,N-diethyl phosphonamidate in 8 ml. of acetic anhydride containing 0.4 ml. of 85% phosphoric acid is heated at 100° for 10 minutes, then cooled to 80° and 4 ml. of water is added to destroy the excess acetic anhydride. When the decomposition is complete 20 ml. water is added, the mixture is cooled to 0° and the product is filtered off to obtain ethyl 5-(p-fluorophenyl)-2-acetoxyphenyl-N,N-diethyl phosphonamidate.

When the acetic anhydride is replaced in the above example with propionic anhydride, butyric anhydride or crotonic anhydride, the corresponding product is prepared.

When ethyl 5-(p-fluorophenyl)-2-hydroxyphenyl-N,N-diethylphosphonamidate is replaced in the above example by the compounds of Table I, Example V-2, the corresponding product is prepared. A representative list of the compounds thus prepared is shown below.

5-(p-fluorophenyl)-2-acetoxyphenyl phosphonamidic acid
methyl 5-(p-fluorophenyl)-2-acetoxyphenyl-N,N-dimethyl phosphonamidate
methyl 5-(p-fluorophenyl)-2-acetoxyphenyl phosphinomorpholidate
ethyl 5-(p-nitrophenyl)-2-acetoxyphenyl-N,N-diethyl phosphonamidate
methyl 5-(p-nitrophenyl)-2-butyroxyphenyl-N-methyl-N-i-propyl phosphonamidate
cyclopropyl 5-(p-dimethylaminophenyl)-2-acetoxyphenyl-N,N-diethyl phosphonamidate
ethyl 5-(o-methylphenyl)-2-acetoxyphenyl-N,N-diethyl phosphonamidate
ethyl 5-(α-naphthylphenyl)-2-acetoxyphenyl-N,N-diethyl phosphonamidate
phenyl 5-(p-trifluoromethylphenyl)-2-acetoxyphenyl-phosphono-N'-methylpiperazidate
methyl 5-(2,6-dichlorophenyl)-2-crotonoxyphenyl-N,N-dimethyl phosphonamidate

EXAMPLE VII.—DIETHYL 5-(p-FLUOROPHENYL)-2-HYDROXYPHENYL PHOSPHONITE

Example VII-1

Diethyl 5 - (p - fluorophenyl)-2-benzyloxyphenyl phosphonite.—To 1.0 mole of 4'-fluoro-4-benzyloxybiphenyl-3-magnesium bromide (prepared from 1 mole of 4'-fluoro-3-bromo-4-benzyloxybiphenyl and 1 mole of magnesium in 10 volumes of ether), is added dropwise with stirring 1 mole of triethyl phosphite at room temperature followed by 5 volumes of anhydrous benzene. Part of the ether is then distilled out of the mixture until the internal temperature reaches 65°. The mixture is then stirred under reflux at this temperature for 3 hours, cooled, filtered, and the solvent distilled off in vacuo leaving the product, diethyl 5 - (p-fluorophenyl)-2-benzyloxyphenyl phosphonite.

When the compounds of Table I, Example I-2, are used in the above example in place of 4'-fluoro-3-bromo-4-benzyloxybiphenyl, the corresponding diethylphosphonites are prepared.

When the triethyl phosphite in the above example is replaced by trimethyl phosphite, triisopropylphosphite, methyldiethylphosphite and tribenzylphosphite, the corresponding diester is prepared. A representative list of the compounds prepared is shown in Table I below.

Table I dimethyl 5-(p-fluorophenyl)-2-benzyloxyphenyl phosphonite
methyl, ethyl 5-(p-fluorophenyl)-2-benzyloxyphenyl phosphonite
dibenzyl 5-(p-fluorophenyl)-2-benzyloxyphenyl phosphonite
diethyl 5-(p-chlorophenyl)-2-benzyloxyphenyl phosphonite
diisopropyl 5-(p-nitrophenyl)-2-benzyloxyphenyl phosphonite
dibenzyl 5-(p-nitrophenyl)-2-benzyloxyphenyl phosphonite
diethyl 5-(p-dimethylaminophenyl)-2-benzyloxyphenyl phosphonite
dimethyl 5-(p-trifluoromethylphenyl)-2-benzyloxyphenyl phosphonite
diethyl 5-(α-naphthyl)-2-benzoyloxyphenyl phosphonite
diethyl 5-styryl-2-benzyloxyphenyl phosphonite When the compounds of Table II, Example I-2, are used in place of 4'-fluoro-3-bromo-4-benzyloxybiphenyl in the above example, the corresponding phosphonous acid diesters are prepared. A representative list of these compounds is shown in Table II below.

Table II dimethyl 5-(p-fluorophenyl)-2-methoxyphenyl phosphite
diethyl 5-(p-fluorophenyl)-2-ethoxyphenyl phosphonite
diethyl 5-(p-fluorophenyl)-2-phenethoxyphenyl phosphonite
diethyl 5-(p-chlorophenyl)-2-methoxyphenyl phosphonite
diethyl 5-(p-nitrophenyl)-2-methoxyphenyl phosphonite
dimethyl 5-(p-nitrophenyl)-2-phenethoxyphenyl phosphonite
diethyl 5-(p-dimethylaminophenyl)-2-methoxyphenyl phosphonite
dibenzyl 5-(p-trifluoromethylphenyl)-2-ethoxyphenyl phosphonite
diisopropyl 5-(p-methoxyphenyl)-2-propoxyphenyl phosphonite
methyl, ethyl 5-(p-fluorophenyl)-2-methoxyphenyl phosphonite
dimethyl 5-(α-naphthyl)-2-methoxyphenyl phosphonite
diethyl 5-styryl-2-methoxyphenyl phosphonite
dibenzyl 5-styryl-2-methoxyphenyl phosphonite
diethyl 5-(p-methylphenyl)-2-methoxyphenyl phosphonite

Example VII-2

Diethyl 5 - (p - fluorophenyl)-2-hydroxyphenyl phosphonite.—A solution of 0.05 mole of diethyl 5-(p-fluorophenyl)-2-benzyloxyphenyl phosphonite in 65 ml. of methanol is hydrogenated, using 10% ruthenium-on-charcoal (2.5 g.) to a one mole hydrogen uptake. The mixture is filtered through Filtercel and evaporated to leave diethyl 5-(p-fluorophenyl)-2-hydroxyphenyl phosphonite.

When the compounds of Table I, Example VII-1, are used in the above example in place of diethyl 5-(p-fluorophenyl)-2-benzyloxyphenyl phosphonite, the corresponding products of Table I are prepared.

Table I dimethyl 5-(p-fluorophenyl)-2-hydroxyphenyl phosphonite
methyl, ethyl 5-(p-fluorophenyl)-2-hydroxyphenyl phosphonite
diethyl 5-(p-chlorophenyl)-2-hydroxyphenyl phosphonite
diisopropyl 5-(p-nitrophenyl)-2-hydroxyphenyl phosphonite
diethyl 5-(p-dimethylaminophenyl)-2-hydroxyphenyl phosphonite
dimethyl 5-(p-trifluoromethylphenyl)-2-hydroxyphenyl phosphonite
diethyl 5-(α-naphthyl)-2-hydroxyphenyl phosphonite
diphenyl 5-(β-naphthyl)-2-hydroxyphenyl phosphonite

EXAMPLE VIII 5-(p-fluorophenyl)-2-hydroxyphenyl phosphonous acid

A mixture of 0.1 mole of diethyl 5-(p-fluorophenyl)-2-hydroxyphenyl phosphonite in 100 ml. of 3 N aqueous sodium hydroxide solution is heated to 80° with stirring for 2 hours. The solution is cooled to 0° and acidified dropwise with an excess of 4 N sulfuric acid. The precipitate is extracted with chloroform, washed with water, dried over magnesium sulfate, filtered, and evaporated in vacuo to leave the product, 5-(p-fluorophenyl)-2-hydroxyphenyl phosphonous acid.

When diethyl 5-(p-fluorophenyl)-2-hydroxyphenyl phosphonite is replaced in the above example by the compounds of Table I, Example VIII-2, the corresponding phosphonous acids of Table I below are prepared.

Table I 5-(p-fluorophenyl)-2-hydroxyphenyl phosphonous acid
5-(p-chlorophenyl)-2-hydroxyphenyl phosphonous acid
5-(p-nitrophenyl)-2-hydroxyphenyl phosphonous acid
5-(p-dimethylaminophenyl)-2-hydroxyphenyl phosphonous acid
5-(p-trifluoromethylphenyl)-2-hydroxyphenyl phosphonous acid
5-(α-naphthyl)-2-hydroxyphenyl phosphonous acid
5-(β-naphthyl)-2-hydroxyphenyl phosphonous acid

EXAMPLE IX 5-(p-fluorophenyl)-2-actoxyphenyl phosphonous acid

A solution of 4 g. of 5-(p-fluorophenyl)-2-hydroxyphenyl phosphonous acid dissolved in 8 ml. of acetic anhydride and containing 0.4 ml. of 85% phosphoric acid is heated at 100° for 10 minutes, cooled to 80°, and 4 ml. of water is added to destroy the excess acetic anhydride. When the decomposition is complete, 20 ml. water is added and the mixture cooled to 0° and the product is filtered off to leave 5-(p-fluorophenyl)-2-acetoxyphenyl phosphonous acid.

When propionic anhydride, butyric anhydride or crotonic anhydride are used in place of acetic anhydride in the above example, the products prepared are 5-(p-fluorophenyl)-2-propionyloxyphenyl phosphonous acid, 5-(p-fluorophenyl)-2-butyryloxyphenyl phosphonous acid and 5-(p-fluorophenyl)-2-crotonyloxyphenyl phosphonous acid.

When the compounds of Example VIII are used in place of 5-(p-fluorophenyl)-2-hydroxyphenyl phosphonous acid in the above example, the corresponding acyloxy compounds are prepared. A representative list of these compounds is shown below in Table I.

Table I 5-(p-chlorophenyl)-2-propionyloxyphenyl phosphonous acid
5-(p-nitrophenyl)-2-propionyloxyphenyl phosphonous acid
5-(p-trifluoromethylphenyl)-2-propionyloxyphenyl phosphonous acid
5-(α-naphthyl)-2-butyryloxyphenyl phosphonous acid
5-(p-methoxyphenyl)-crotonyloxyphenyl phosphonous acid
5-(p-nitrophenyl)-2-crotonyloxyphenyl phosphonous acid When the compounds of Table I, Example VII-2, are used in the above procedure in place of 5-(p-fluorophenyl)-2-hydroxyphenyl phosphonous acid, the corresponding acyloxy compounds of Table II below are prepared.

Table II dimethyl 5-(p-fluorophenyl)-2-acetoxyphenyl phosphonite
methyl, ethyl 5-(p-fluorophenyl)-2-acetoxy-phenyl phosphonite
diethyl 5-(p-fluorophenyl)-2-acetoxyphenyl phosphonite
diethyl 5-(p-chlorophenyl)-2-acetoxyphenyl phosphonite
diisopropyl 5-(p-nitrophenyl)-2-acetoxyphenyl phosphonite
diethyl 5-(p-dimethylaminophenyl)-2-acetoxyphenyl phosphonite
dimethyl 5-(p-trifluoromethylphenyl)-2-acetoxyphenyl phosphonite
diethyl 5-(α-naphthyl)-2-acetoxyphenyl phosphonite
dimethyl 5-(β-naphthyl)-2-acetoxyphenyl phosphonite

EXAMPLE X.—5 - (p-FLUOROPHENYL) - 2 - HYDROXYPHENYL PHOSPHONOUS DIPYRROLIDINAMIDE

Example X–1

5 - (p-fluorophenyl)-2-benzyloxyphenyl dichlorophosphine.—To 0.3 mole of phosphorus trichloride in 250 ml. of ether maintained at 5° is added diethyl 5-(p-fluorophenyl)-2-benzyloxyphenyl phosphonite in small portions. The mixture is then stirred at 5° for 20 minutes, evaporated to dryness at 100° and 1 mm. pressure. The product 5 - (p-fluorophenyl)-2-benzyloxyphenyl dichlorophosphine results.

When diethyl 5 - (p-fluorophenyl)-2-benzyloxyphenyl phosphonite is replaced in the above example by the compounds of Example VII-1, the corresponding dichlorophosphine compound results.

In an exactly analogous manner the above dihydrophosphines may be prepared from the 3-phosphonous acids.

Example X–2

5-(p-fluorophenyl)-2-benzyloxyphenyl phosphonous dipyrrolidinamide.—To an anhydrous solution of 0.4 mole of pyrrolidine in 40 ml. of ether is added 5-(p-fluorophenyl)-2-benzyloxyphenyl dichlorophosphine (0.1 mole) in small portions with stirring. The mixture is then refluxed with stirring for 2 hours and cooled to room temperature. The precipitated amine hydrochloride is filtered off and the ethereal filtrate containing the product is washed with water, dried over magnesium sulftae, filtered, and evaporated to dryness leaving 5-(p-fluorophenyl)-2-benzyloxyphenyl phosphonous dipyrrolidinamide.

The corresponding phosphonous diamide is prepared when pyrrolidine is replaced in the above example by ammonia, dimethylamine, diethylamine, methylethylamine, ethylamine, dibenzylamine, dicyclopropylamine, diphenylamine, piperidine, morpholine or N-methyl-piperazine.

When the appropriate 5-aryl-2-benzyloxyphenyl dichlorophosphine compound from Example X-1 is used in the above example in place of 5-(p-fluorophenyl)-2-benzylphenyl dichlorophosphine, the corresponding product is obtained. A representative list of the compound prepared is shown below in Table I.

Table I 5-(p-fluorophenyl)-2-benzyloxyphenyl phosphonous diamide
5-(p-fluorophenyl)-2-benzyloxyphenyl phosphonous N,N,N',N'-tetraethyl diamide TABLE I—Continued 5-(p-fluorophenyl)-2-benzyloxyphenyl phosphonous N,N,N',N'-tetrabenzyl diamide
5-(p-chlorophenyl)-2-benzyloxyphenyl phosphonous N,N,N',N'-tetracyclopropyl diamide
5-(p-nitrophenyl)-2-benzyloxyphenyl phosphonous di-(N'-methylpiperazinamide
5-(p-trifluoromethylphenyl)-2-benzyloxyphenyl phosphonous N,N,N',N'-tetraethyl diamide
5-($\beta$-naphthyl)-2-benzyloxyphenyl phosphonous diamide
5-(p-dimethylaminophenyl)-2-benzyloxyphenyl phosphonous N,N'-dimethyl-N,N'-diethyl diamide
5-styryl-2-benzyloxyphenyl phosphonous N,N,N',N'-tetraethyl diamide When the appropriate 5-aryl-2-alkoxy, aralkoxy or phenoxyphenyl dichlorophosphine compound from Example X–1 is used in the above example in place of 5-(p-fluorophenyl)-2-benzyloxyphenyl dichlorophosphine, the corresponding product is obtained. A representative list of the compounds is shown in Table II below.

Table II 5-(p-fluorophenyl)-2-methoxyphenyl phosphonous N,N,N',N'-tetraethyl diamide
5-(p-fluorophenyl)-2-ethoxyphenyl phosphonous N,N,N',N'-tetraethyl diamide
5-(p-fluorophenyl)-phenethoxyphenyl phosphonous N,N,N',N'-tetracyclopropyl diamide
5-(p-nitrophenyl)-2-methoxyphenyl phosphonous N,N,N',N'-tetramethyl diamide
5-(p-chlorophenyl)-methoxyphenyl phosphonous N,N'-dimethyl-N,N'-diethyl diamide
5-(p-trifluoromethylphenyl)-2-ethoxyphenyl phosphonous di-(N'-methylpiperazinamide)
5-(p-methoxyphenyl)-2-propoxyphenyl phosphonous N,N,N',N'-tetraethyl diamide
5-(p-fluorophenyl)-2-methoxyphenyl phosphonous N,N,N',N'-tetraethyl diamide
5-($\alpha$-naphthyl)-2-methoxyphenyl phosphonous diamide
5-($\alpha$-naphthyl)-2-methoxyphenyl phosphonous N,N,N',N'-tetramethyl diamide
5-styryl-2-methoxyphenyl phosphonous N,N,N',N'-tetramethyl diamide
5-(p-methylphenyl)-2-methoxyphenyl phosphonous N,N,N',N'-tetramethyl diamide
5-(p-fluorophenyl)-2-phenethoxyphenyl phosphonous N,N,N',N'-tetrabenzyl diamide

EXAMPLE X–3

5 - (p-fluorophenyl)-2-hydroxyphenyl phosphonous di-pyrrolidinamide.—A solution of 0.01 mole of 5-(p-fluorophenyl) - 2 - benzyloxyphenyl phosphonous dipyrrolidinamide in 15 ml. of methanol is hydrogenated, using 10% ruthenium-on-charcoal (0.5 g.) to a 1 mole hydrogen uptake. The mixture is filtered through Filtercel and evaporated to leave 5-(p-fluorophenyl)-2-hydroxyphenyl phosphonous dipyrrolidinamide.

When the compounds of Table I, Example X–2, are used in the above example in place of 5-(p-fluorophenyl)-2 - benzyloxyphenyl phosphonous dipyrrolidinamide, the corresponding products of Table I below are prepared.

Table I 5-(p-fluorophenyl)-2-hydroxyphenyl phosphonous diamide
5-(p-fluorophenyl)-2-hydroxyphenyl phosphonous N,N,N',N'-tetraethyl diamide
5-(p-chlorophenyl)-2-hydroxyphenyl phosphonous N,N,N',N'-tetracyclopropyl diamide
5-(p-nitrophenyl)-2-hydroxyphenyl phosphine di-(N-methylpiperazinamide)
5-(p-trifluoromethylphenyl)-2-hydroxyphenyl phosphonous N,N,N',N'-tetraethyl diamide
5-($\beta$-naphthyl)-2-hydroxyphenyl phosphonous diamide
5-(p-dimethylaminophenyl)-2-hydroxyphenyl phosphonous N,N'-dimethyl-N,N'-diethyl diamide

EXAMPLE XI 5-(p-fluorophenyl)-2-acetoxyphenyl phosphonous dipyrrolidinamide

A solution of 1 g. of 5-(p-fluorophenyl)-2-hydroxyphenyl phosphonous di-(pyrrolidinamide) dissolved in 2 ml. of acetic anhydride and containing 0.1 ml. of 85% phosphoric acid is heated at 100° for 10 minutes, cooled to 80° and 1 ml. of water is added to destroy the excess acetic anhydride. When the decomposition is complete, 5 ml. of water is added and the mixture cooled to 0° and the product filtered off to leave 5-(p-fluorophenyl)-2-acetoxyphenyl phosphonous di-(pyrrolidinamide).

When propionic anhydride butyric anhydride or crotonic anhydride are used in place of acetic anhydride in the above example, the corresponding acyloxy product is obtained.

When the compounds of Example X–3 are used in place of 5-(p-fluorophenyl)-2-hydroxyphenyl phosphonous di-(pyrrolidinamide) in the above example, the corresponding acyloxy compounds are prepared. A representative list of these compounds is shown below.

5-(p-fluorophenyl)-2-acetoxyphenyl phosphonous diamide
5-(p-fluorophenyl)-2-acetoxyphenyl phosphonous N,N,N',N'-tetraethyl diamide
5-(p-chlorophenyl)-2-acetoxyphenyl phosphonous N,N,N',N'-tetracyclopropyl diamide
5-(p-trifluoromethylphenyl)-2-acetoxyphenyl phosphonous N,N,N',N'-tetraethyl diamide
5-($\beta$-naphthyl)-2-acetoxyphenyl phosphonous diamide
5-(p-dimethylaminophenyl)-2-acetoxyphenyl phosphonous N,N'-dimethyl-N,N'-diethyl diamide EXAMPLE XII ETHYL 5 - (p-FLUOROPHENYL)-2-HYDROXYL - N,N - DIETHYL PHOSPHONAMIDITE Example XII–1

Ethyl 5 - (p-fluorophenyl)-2-benzyloxyphenyl-N,N-diethyl phosphonamidite.—A solution of 0.1 mole of 4'-fluoro-4-benzyloxybiphenyl-3 - magnesium bromide (prepared from 0.1 mole of 4'-fluoro-3-bromo-4-benzyloxybiphenyl and 0.1 mole of magnesium in ether by the conventional method), is added dropwise over a 30 minute period to a solution of 0.1 mole of ethyl N,N-diethyl phosphoramidochloridite in volumes of ether. The reaction mixture is then stirred and heated to reflux for 2 hours, decomposed by adding ice and a slight excess of aqueous 1 N hydrochloric acid. The ethereal layer is washed with water, dried over magnesium sulfate, and evaporated to dryness, leaving ethyl 5-(p-fluorophenyl)-2-benzyloxy-N, N-diethyl phosphonamidite The corresponding amide-ester is prepared when ethyl N,N-diethyl phosphoramidochloridite is replaced in the example above by:

methyl N,N-dimethylphosphoramidochloridite
methyl N,N-diethylphosphoramidochloridite
methyl N,N-dibenzylphosphoramidochloridite
benzyl N,N-diethylphosphoramidochloridite
cyclopropyl N,N-diethylphosphoramidochloridite
methyl phosphoromorpholidochloridite
phenyl phosphoro-(N'-methylpiperazido)chloridite
methyl N-methyl-N-i-propyl phosphoramidochloridite When the compounds of Table I, Example I–2 are used in place of 4'-fluoro-3-bromo-4-benzyloxybisphenyl in the above example, the corresponding amide-ester is prepared. A representative list of these compounds is shown below in Table I.

Table I methyl 5-(p-fluorophenyl)-2-benzyloxyphenyl-N,N-dimethyl phosphonamidite TABLE I—Continued benzyl 5-(p-fluorophenyl)-2-benzyloxyphenyl-N,N-diethyl phosphonamidite
methyl 5-(p-fluorophenyl)-2-benzyloxyphenyl phosphonomorpholidite
ethyl 5-(p-nitrophenyl)-2-benzyloxyphenyl-N,N-diethyl phosphonamidite
methyl 5-(p-nitrophenyl)-2-benzyloxyphenyl-N-methyl-N-i-propyl phosphonamidite
cyclopropyl 5-(p-dimethylaminophenyl)-2-benzyloxyphenyl-N,N-diethyl phosphonamidite
ethyl 5-(o-methylphenyl)-2-benzyloxyphenyl-N,N-diethyl phosphonamidite
ethyl 5-(α-naphthylphenyl)-2-benzyloxyphenyl-N,N-diethyl phosphonamidite
ethyl 5-styryl-2-benzyloxyphenyl-N,N-diethyl phosphonamidite
phenyl 5-(p-trifluoromethylphenyl)-2-benzyloxyphenyl-phosphono-(N'-methylpiperazidite)
methyl 5-(2,6-dichlorophenyl)-2-benzyloxyphenyl-N,N-dimethyl phosphonamidite
methyl 5-(p-methoxyphenyl)-2-benzyloxyphenyl-N,N-dibenzyl phosphonamidite When the compounds of Table II, Example I–2, are used in place of 4'-fluoro-3-bromo-4-benzyloxybiphenyl in the above example, the corresponding amide-ester is prepared. A representative list of these compounds is shown in Table II below.

Table II methyl 5-(p-fluorophenyl)-2-methoxyphenyl-N,N-dimethyl phosphonamidite
ethyl 5-(p-fluorophenyl)-2-methoxyphenyl-N,N-diethyl phosphonamidite
ethyl 5-(p-fluorophenyl)-2-ethoxyphenyl-N,N-diethyl phosphonamidite
benzyl 5-(p-nitrophenyl)-2-phenethoxyphenyl-N,N-diethyl phosphonamidite
methyl 5-(p-methylphenyl)-2-methoxyphenyl-N,N-dimethyl phosphonamidite
methyl 5-(p-methoxyphenyl)-2-propoxyphenyl-N,N-dimethyl phosphonamidite
ethyl 5-(α-naphthyl)-2-methoxyphenyl-N,N-diethyl phosphonamidite
phenyl 5-(p-fluorophenyl)-2-phenethoxyphenyl phosphono-(N'-methylpiperazidite)
ethyl 5-styryl-2-methoxyphenyl-N,N-diethyl phosphonamidite
cyclopropyl 5-(p-dimethylaminophenyl)-2-methoxyphenyl-N,N-diethyl phosphonamidite
methyl 5-(p-fluorophenyl)-2-methoxyphenyl phosphono-(N-morpholidite)

EXAMPLE XII–2

Ethyl 5-(p-fluorophenyl) - 2 - hydroxyphenyl-N,N-diethyl phosphonamidite.—A solution of 0.02 mole of ethyl 5-(p-fluorophenyl) - 2 - benzyloxyphenyl-N,N-diethylphosphonamidite in 100 ml. of methanol is hydrogenated using 1.0 g. of 10% ruthenium-on-charcoal with a 1 mole uptake of hydrogen. The mixture is filtered through a pad of Filtercel and evaporated to dryness, leaving ethyl 5-(p-fluorophenyl) - 2 - hydroxyphenyl-N,N-diethylphosphonamidite.

When the compounds of Table I, Example V–1 are used in place of ethyl 5-(p-fluorophenyl)-2-benzyloxyphenyl-N,N-diethylphosphonamidite in the above example, the corresponding product of Table I below is prepared.

Table I methyl 5-(p-fluorophenyl)-2-hydroxyphenyl-N,N-dimethyl phosphonamidite
methyl 5-(p-fluorophenyl)-2-hydroxyphenyl phosphonamidite
ethyl 5-(p-nitrophenyl)-2-hydroxyphenyl-N,N-diethyl phosphonamidite
methyl 5-(p-nitrophenyl)-2-hydroxyphenyl-N-methyl-N-i-propyl phosphonamidite
cyclopropyl 5-(p-dimethylaminophenyl)-2-hydroxyphenyl-N,N-diethyl phosphonamidite
ethyl 5-(o-methylphenyl)-2-hydroxyphenyl-N,N-diethyl phosphonamidite
ethyl 5-(α-naphthylphenyl)-2-hydroxyphenyl-N,N-diethyl phosphonamidite
phenyl 5-(p-trifluoromethylphenyl-2-hydroxyphenyl-phosphono-(N'-methylpiperazidite)
methyl 5-(2,6-dichlorophenyl)-2-hydroxyphenyl-N,N-dimethyl phosphonamidite

EXAMPLE XIII

Ethyl 5-(p-fluorophenyl)-2-acetoxyphenyl-N,N-diethyl phosphonamidite

A solution of 4 g. of ethyl 5-(p-fluorophenyl)-2-hydroxyphenyl-N,N-diethyl phosphonamidite in 8 ml. of acetic anhydride containing 0.4 ml. of 85% phosphoric acid is heated at 100° for 10 minutes, then cooled to 80° and 4 ml. of water is added to destroy the excess acetic anhydride. When the decomposition is complete 20 ml. of water is added, the mixture is cooled to 0° and the product is filtered off to obtain ethyl 5-(p-fluorophenyl)-2-acetoxyphenyl-N,N-diethyl phosphonamidite.

When the acetic anhydride is replaced in the above example with propionic anhydride, butyric anhydride or crotonic anhydride, the corresponding product is prepared.

When ethyl 5-(p-fluorophenyl)-2-hydroxyphenyl-N,N-diethylphosphonamidite is replaced in the above example by the compounds of Table I, Example V–2, the corresponding product is prepared. A representative list of the compounds thus prepared is shown below.

methyl 5-(p-fluorophenyl)-2-acetoxyphenyl-N,N-dimethyl phosphonamidite
methyl 5-(p-fluorophenyl)-2-acetoxyphenyl phosphonamidite
ethyl 5-(p-nitrophenyl)-2-acetoxyphenyl-N,N-diethyl phosphonamidite
methyl 5-(p-nitrophenyl)-2-acetoxyphenyl-N-methyl-N-i-propyl phosphonamidite
cyclopropyl 5-(p-dimethylaminophenyl)-2-acetoxyphenyl-N,N-diethyl phosphonamidite
ethyl 5-(o-methylphenyl)-2-acetoxyphenyl-N,N-diethyl
ethyl 5-(α-naphthylphenyl)-2-acetoxyphenyl-N,N-diethyl phosphonamidite
phenyl 5-(p-trifluoromethylphenyl)-2-acetoxyphenyl-phosphono-(N'-methylpiperazidite)
methyl 5-(2,6-dichlorophenyl)-2-acetoxyphenyl-N,N-dimethyl phosphonamidite

EXAMPLE XIV

Disodio 5-(p-fluorophenyl)-2-hydroxyphenyl phosphonate

To a solution of 0.002 mole of sodium hydroxide in 15 ml. of water is added 0.001 mole of 5-(p-fluorophenyl)-2-hydroxyphenyl phosphonic acid in 10 ml. of ethanol. The mixture is stirred for 15 minutes and then evaporated in vacuo to obtain disodio 5-(p-fluorophenyl)-2-hydroxyphenyl phosphonate.

When an equimolar amount of potassium hydroxide, lithium carbonate, aluminum hydride, sodium carbonate or calcium hydroxide are used in place of sodium hydroxide, the corresponding di-salt is prepared.

When the 5-(p-fluorophenyl)-2-hydroxyphenyl phosphonic acid of the above procedure is replaced by any of the phosphonic or phosphonous acid compounds of this invention, the corresponding di-salt is prepared.

When the 5-(p-fluorophenyl)-2-hydroxyphenyl phosphonic acid of the above procedure is replaced by any of the mixed acid-amides or acid-esters of the phosphonic acids, or the acid esters of the phosphonous acids of this invention, the amount of base used should be an equivalent ratio.

When the corresponding metal salt of the phenol is desired, an additional equivalent of base should be used.

EXAMPLE XV

Diphenyl 5-(p-fluorophenyl)-2-benzyloxyphenyl phosphonite

To an anhydrous solution of phenol (0.2 mole) and pyridine (0.2 mole) in ether (100 ml.) at 0° is added 5-(p-fluorophenyl) - 2 - benzyloxyphenyl dichlorophosphine (0.1 mole) in small portions with stirring. The mixture is then refluxed for 2 hours, cooled to room temperature, and filtered from pyridine hydrochloride. The filtrate is washed with a little water, dried over magnesium sulfate, filtered, and evaporated to dryness, leaving diphenyl 5-(p-fluorophenyl)-2-benzyloxyphenyl phosphonite.

In a similar way the other phosphonite esters can be prepared.

The following representative examples illustrate the interconversion or introduction of functional groups which can be accomplished at various stages of the preparation of the final products.

Dimethyl 5-(p-aminophenyl)-2-methoxyphenyl phosphonite

A mixture of pure dimethyl 5-(p-nitrophenyl)-2-methoxyphenyl phosphonite (0.01 mole) in methanol-dioxane (1:1) (ca. 200 ml.) is reacted with hydrogen at room temperature (40 p.s.i.) in the presence of 10% Pd/C (1.0 g.). The mixture is filtered, the cake washed well with methanol, the filtrate evaporated in vacuo and the residue chromatographed on a silica gel column using a methanol-methylene chloride system (v./v. 0–30% methanol) as eluant to yield dimethyl 5-(p-aminophenyl)-2-methoxyphenyl phosphonite.

5-(p-hydroxyphenyl)-2-methoxyphenyl phosphonous acid

A mixture of dimethyl 5-(p-aminophenyl)-2-methoxyphenyl phosphonite (0.2 mole), water (600 ml.) and concentrated sulfuric acid (25 ml.) is cooled to 10° C. and a solution of sodium nitrite (0.21 mole) in a minimum of water is added gradually. When the presence of free nitrous acid is detected (starch-iodide paper), the addition is stopped and the diazotization mixture is allowed to warm to room temperature, then heated on a steam-bath until there is no more nitrogen evolution. The solution is cooled to 0° and 5-(p-hydroxyphenyl)-2-methoxyphenyl-phosphonous acid filtered off.

Diphenyl 5-(p-methylsulfonylphenyl)-2-ethoxyphenyl phosphonite

To an ice-cooled solution of diphenyl 5-(p-methylthiophenyl)-2-ethoxyphenyl phosphonite (0.01 mole) in methanol-acetone is added a solution of sodium metaperiodate (0.01 mole) in a minimum of water, and the mixture stirred at 0–8° C. until precipitation of sodium iodate is completed. The iodate is removed by filtration, the solvents removed in vacuo, and the residue taken up in chloroform and ether. The combined organic extracts are dried, filtered and concentrated. Purification of the diphenyl 5-(p-methylsulfinylphenyl)-2-ethoxyphenyl phosphonite is affected via recrystallization or chromatography (silica gel).

We claim:

1. A compound of the formula:

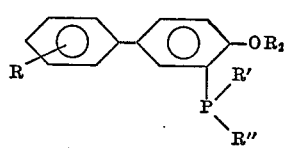

or a salt thereof with a non-toxic pharmaceutically acceptable base, wherein:

R is one or more of hydrogen, halogen, haloloweralkyl;
R' and R" are
—OH, or
—$OR_1$ wherein $R_1$ is lower alkyl, phenyl or phenyl-lower alkyl; and
$R_2$ is hydrogen or lower alkanoyl.

2. A compound of the formula:

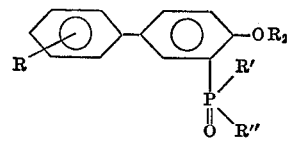

or a salt thereof with a non-toxic pharmaceutically acceptable base, wherein:

R is one or more of hydrogen, halogen, haloloweralkyl;
R' and R" are
—OH, or
—$OR_1$ wherein $R_1$ is lower alkyl, phenyl or phenyl-lower alkyl; and
$R_2$ is hydrogen or lower alkanoyl.

3. A compound according to claim 1 or a salt thereof with a pharmaceutically acceptable base where R is halo;
R' and R" are
—OH, or
—$OR_1$ where $R_1$ is lower alkyl, and
$R_2$ is hydrogen or acetyl.

4. A compound according to claim 2 or a salt thereof with a pharmaceutically acceptable base where
R is halo;
R' and R" are
—OH, or
—$OR_1$ where $R_1$ is lower alkyl, and
$R_2$ is hydrogen or acetyl.

5. A compound according to claim 1 where
R is p-fluoro;
R' and R" are —OH; and
$R_2$ is hydrogen;
said compound being 5-(p-fluorophenyl)-2-hydroxyphenyl phosphonous acid.

6. A compound according to claim 1 where
R is p-fluoro;
R' and R" are —OH; and
$R_2$ is acetyl,
said compound being 5-(p-fluorophenyl)-2-acetoxyphenyl phosphonous acid.

7. A compound according to claim 2 where
R is p-fluoro;
R' and R" are —OH; and
$R_2$ is hydrogen,
said compound being 5-(p-fluorophenyl) - 2 - hydroxyphenyl phosphonic acid.

8. A compound according to claim 2 where
R is p-fluoro;
R' and R" are —OH; and
$R_2$ is acetyl,
said compound being 5 - (p-fluorophenyl) - 2 - acetoxyphenyl phosphonic acid.

9. A compound of the formula

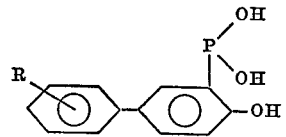

where R is one or more halogen substituents which may be at any position on the ring.

10. A compound of the formula

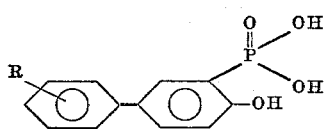

where R is one or more halogen substituents which may be at any position on the ring.

References Cited
UNITED STATES PATENTS

| | | | |
|---|---|---|---|
| 2,423,569 | 7/1947 | Sokol | 260—488 R |
| 2,279,501 | 4/1942 | Dickey et al. | 260—488 R |
| 3,023,183 | 2/1962 | Nelson | 260—488 R |
| 2,594,454 | 4/1952 | Kosolapoff | 260—502.4 R |
| 2,632,018 | 3/1953 | Kosolapoff | 260—502.4 R |
| 3,505,433 | 4/1970 | Frank et al. | 260—502.4 R |
| 2,835,710 | 5/1958 | Holmquist | 260—635 D |
| 3,384,672 | 5/1968 | Illingsworth | 260—643 B |
| 2,776,985 | 1/1957 | McKinnis | 260—502.4 R |
| 3,493,639 | 2/1970 | Tavs | 260—502.4 R |

OTHER REFERENCES

Wagner et al., "Synthetic Organic Chemistry," 1953, pp. 480, 481.

Freedman et al., "J. Org. Chem.," vol. 25 (1960), pp. 140 to 142.

Shokal, "Chem. Abstracts," vol. 65 (1966), cols. 17144, 17145.

BERNARD HELFIN, Primary Examiner

J. E. EVANS, Assistant Examiner

U.S. Cl. X.R.

260—247, 268 K, 269, 326.8, 488 R, 502.4 R, 543 P, 551 P, 557 R, 609 R, 613 D, 622 R, 623 R, 961, 999